No. 623,975. Patented May 2, 1899.
G. W. BENNUM.
FRAME FOR MAGNIFYING GLASSES.
(Application filed Feb. 3, 1898.)

(No Model.)

Witnesses:
H. B. Hallock
R. M. Pierce

Inventor:
George W. Bennum
by S. S. Williamson
Attorney.

UNITED STATES PATENT OFFICE.

GEORGE W. BENNUM, OF GEORGETOWN, DELAWARE.

FRAME FOR MAGNIFYING-GLASSES.

SPECIFICATION forming part of Letters Patent No. 623,975, dated May 2, 1899.

Application filed February 3, 1898. Serial No. 668,943. (No model.)

*To all whom it may concern:*

Be it known that I, GEORGE W. BENNUM, a citizen of the United States, residing at Georgetown, in the county of Sussex and State of Delaware, have invented a certain new and useful Improvement in Holders or Frames for Magnifying-Glasses, of which the following is a specification.

My invention relates to a new and useful improvement in holders or frames for magnifying-glasses which are to be used in connection with the observation of work being performed, and has for its object to provide an exceedingly simple means for attaching said holder to a spectacle-frame, so that it may be securely held in place without the removal of the spectacles and may be easily detached therefrom when occasion requires.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1:
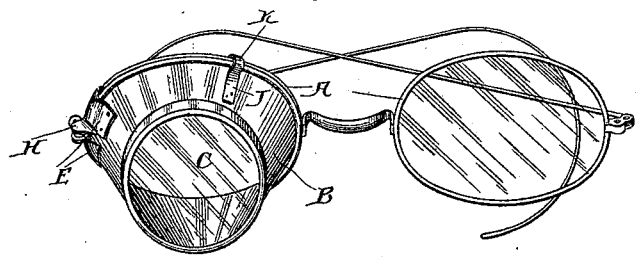
Figure 2:
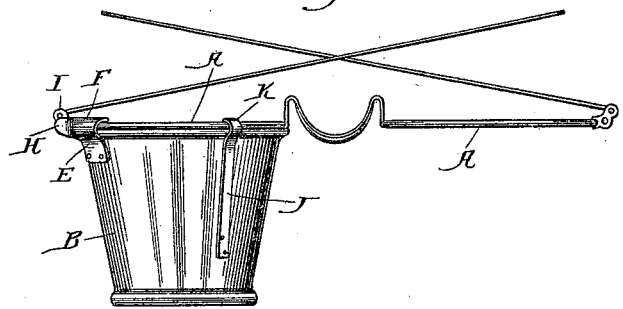
Figure 3:
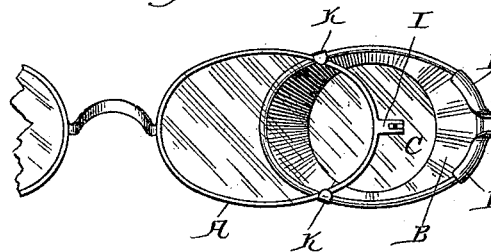

Figure 1 represents a pair of spectacles having a magnifying-glass attached thereto by means of my improvement; Fig. 2, an edge view of the spectacles, also showing the magnifying-glass attached thereto; Fig. 3, a view looking outward through the lens of the spectacles and showing the magnifying-glass just prior to its initial engagement with the spectacles, and Fig. 4 a similar view after the magnifying-glass has been forced in place.

In carrying out my invention as here embodied, A represents the frame of the spectacles, and B the holder of the magnifying-glass, the lens being indicated at C. This holder is so shaped at its flared end as to correspond to the general shape of the spectacle-frame, so that when placed thereon it will in no wise obstruct the view through the lens of the spectacles. A clip E is secured at one end of the holder and has its upper edge turned over, so as to form flanges F, which are separated from each other by a space, as indicated at G, and at this point each of the flanges are turned outward, so as to form guides H for the temple-lug I of the spectacle-frame, and this lug in passing between the guides serves as means for centering the holder, and when the flanges have passed over the rim of the frame they will prevent the rim from outward displacement, thereby holding this portion of the holder in place.

Spring-strips J, here shown as two in number, are secured in any convenient manner to the sides of the holder, and their upper ends project over the ends of the holder and are so bent as to form hooks K, which nevertheless may be pressed outward for the purpose next explained.

Figure 4:
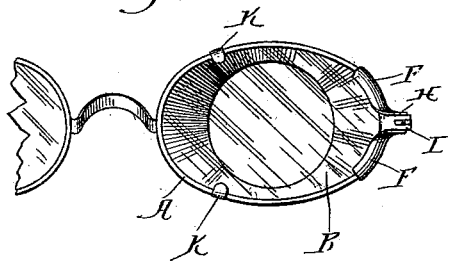

In attaching the holder to the spectacle-frame the hooks are first placed in contact with one of the rims, as shown in Fig. 3, and then by forcing the holder inward these hooks will be sprung backward and yet remain in engagement with the rim until passing over the enlarged central portion thereof, when they will again move inward during the inward movement of the holder until the outer portion of the rim passes under the flanges F, in which position the holder will be retained, as shown in Fig. 4, by the joint action of the flanges and the hooks.

When it is desired, the holder may be easily withdrawn from the spectacles by sufficient pressure being exerted in the reversed direction to cause the hooks to spring outward over the enlarged portion of the rim.

When the holder is in position, it so completely fits the spectacles as to in no wise inconvenience the wearer nor obstruct the rays of light which pass through the lenses. Heretofore much inconvenience has been experienced in the use of a magnifying-glass for various kinds of work, such as watchmaking, where the operator also used spectacles, since it necessitated the removal of the spectacles to place the magnifying-glass in position, and, again, when the magnifying-glass was out of use the spectacles had to be replaced, and a further disadvantage existed in the usual means for securing magnifying-glasses upon the wearer; but all of these difficulties have been overcome by my improvement, and the operator may continue to wear the spectacles and apply or withdraw the magnifying-glass, as occasion may require.

It is to be noted that my improvement may be with equal facility applied to a frameless pair of spectacles, in which case a portion of the edge of the holder should be cut away so as to pass over the clips upon the spectacle-rims.

Of course I do not wish to be limited to the exact details of construction here shown, as these may be varied within certain limits without departing from the spirit of my invention, and it is also noted that the material of which the holder is made forms no part of my invention and may be made of that which best suits the requirements.

Having thus fully described my invention, what I claim as new and useful is—

1. In combination with a spectacle-frame, a glass-holder, clips secured to the glass-holder having inturned flanges to embrace the spectacle-frame, a portion of said flanges being arranged to produce guides, spring-straps attached to the sides of the holder and hooks formed at the ends of the straps, substantially as described.

2. In combination with a pair of spectacles, a magnifying-glass holder of the general shape of one of the lenses, a clip secured to one end of the holder, and two spring-hooks secured to the sides thereof, as shown and described.

In testimony whereof I have hereunto affixed my signature in the presence of two subscribing witnesses.

GEORGE W. BENNUM.

Witnesses:
 GEO. MCCURDY,
 R. M. PIERCE.